US010212602B2

(12) United States Patent
RoyChowdhury et al.

(10) Patent No.: US 10,212,602 B2
(45) Date of Patent: Feb. 19, 2019

(54) SYSTEMS AND METHODS FOR DETERMINING SECURITY REPUTATIONS OF WIRELESS NETWORK ACCESS POINTS

(71) Applicant: Symantec Corporation, Mountain View, CA (US)

(72) Inventors: Ajitesh RoyChowdhury, Agartala (IN); Rajdeep Deb, Pune (IN)

(73) Assignee: Symantec Corporation, Mountain View, CA (US)

( * ) Notice: Subject to any disclaimer, the term of this patent is extended or adjusted under 35 U.S.C. 154(b) by 92 days.

(21) Appl. No.: 15/231,714

(22) Filed: Aug. 8, 2016

(65) Prior Publication Data
US 2017/0374555 A1    Dec. 28, 2017

(51) Int. Cl.
*H04W 12/02*    (2009.01)
*H04W 12/12*    (2009.01)
(Continued)

(52) U.S. Cl.
CPC ........... *H04W 12/12* (2013.01); *H04L 63/145* (2013.01); *H04L 63/1483* (2013.01);
(Continued)

(58) Field of Classification Search
CPC . G06F 21/577; H04L 63/1433; H04L 63/145; H04L 63/1483; H04W 12/01;
(Continued)

(56) References Cited

U.S. PATENT DOCUMENTS

| 8,646,074 | B1 * | 2/2014 | Gangadharan | ........ | H04W 12/12 |
| | | | | | 726/22 |
| 2006/0246901 | A1 * | 11/2006 | Sivakumar | ........ | H04W 36/0055 |
| | | | | | 455/436 |

(Continued)

OTHER PUBLICATIONS

Ding, Qing, et al., " Reputation Based Access Point Selection in 802.11 Network," IEEE Third 2008 International Conference on Convergence and Hybrid Information Technology, 2008, pp. 324-329 (IEEE 2008) (Year: 2008).*

(Continued)

*Primary Examiner* — Theodore C Parsons
(74) *Attorney, Agent, or Firm* — FisherBroyles, LLP

(57) ABSTRACT

A computer-implemented method for determining security reputations of wireless network access points may include (1) receiving a unique identifier for a wireless network access point to which a mobile device has connected and security information that identifies the security posture of the mobile device after connecting to the wireless network access point, (2) adding the unique identifier and the security information to a security database, (3) correlating the security information with an additional set of security information that identifies the security posture of an additional mobile device after connecting to the wireless network access point, (4) assigning a security reputation to the wireless network access point, and (5) enabling a requesting mobile device to determine whether to connect to the wireless network access point by providing the security reputation of the wireless network access point to the
(Continued)

requesting mobile device. Various other methods, systems, and computer-readable media are also disclosed.

20 Claims, 6 Drawing Sheets

(51) Int. Cl.
*H04L 29/06* (2006.01)
*H04W 84/12* (2009.01)
*H04W 88/08* (2009.01)

(52) U.S. Cl.
CPC ............ *H04W 12/02* (2013.01); *H04W 84/12* (2013.01); *H04W 88/08* (2013.01)

(58) Field of Classification Search
CPC ..... H04W 12/12; H04W 48/20; H04W 84/12; H04W 88/08
See application file for complete search history.

(56) References Cited

U.S. PATENT DOCUMENTS

| | | | | |
|---|---|---|---|---|
| 2008/0301773 | A1* | 12/2008 | Achtari | G06F 15/16 726/3 |
| 2013/0040603 | A1* | 2/2013 | Stahlberg | H04L 63/126 455/410 |
| 2013/0097710 | A1* | 4/2013 | Basavapatna | H04W 4/02 726/25 |
| 2015/0189511 | A1* | 7/2015 | Lapidous | H04L 63/0272 726/15 |
| 2017/0126705 | A1* | 5/2017 | Mirashrafi | H04W 12/06 |

OTHER PUBLICATIONS

Hotspot ID; https://www.hotspotid.com/; Mar. 22, 2004.

* cited by examiner

SYSTEMS AND METHODS FOR DETERMINING SECURITY REPUTATIONS OF WIRELESS NETWORK ACCESS POINTS

BACKGROUND

Public wireless networks, such as Wi-Fi hotspots, are typically open to any device and may provide a way for users to connect to the Internet while away from their own networks. Although public wireless access points provide mobile devices with open access, devices may become susceptible to security issues due to their openness. In some cases, attackers may set up wireless network access points solely for the purpose of attacking mobile devices that connect to the access points. In other cases, a wireless network access point may be attacked by an outsider without the knowledge or consent of the access point provider, and devices that connect to the access point may be subsequently affected by the attack.

Users are often unable to determine which wireless network access points are safe to use. For example, when multiple wireless network access points are available, users may be unable to determine which access points are secure and which are not. Furthermore, two wireless network access points may use the same name, but one of them may be illegitimate and posing as a legitimate access point. To a user, the two access points may be indistinguishable from each other. Therefore, a better method of evaluating wireless network access points and determining the security risk of access points is needed in order to protect users from attacks. Accordingly, the instant disclosure identifies and addresses a need for additional and improved systems and methods for determining whether wireless network access points are safe.

SUMMARY

As will be described in greater detail below, the instant disclosure generally relates to systems and methods for determining security reputations of wireless network access points by correlating security events on computing devices with wireless network access points to which the devices connected. For example, the disclosed systems may collect information identifying a wireless network access point and information about malware on a device after connecting to the access point. These systems may then determine that other devices connected to the wireless network access point have subsequently been infected by malware and, thus, assign the wireless network access point a low reputation score. Furthermore, by supplying the reputation score to other devices before the devices connect to the wireless network access point, these systems may improve network security for mobile devices.

In one example, a computer-implemented method for determining security reputations of wireless network access points may include (1) receiving, from at least one mobile device, a unique identifier for a wireless network access point to which the mobile device has connected and security information that identifies the security posture of the mobile device after connecting to the wireless network access point, (2) adding both the unique identifier and the security information to a security database, (3) correlating, using the unique identifier, the security information with at least one additional set of security information that identifies the security posture of at least one additional mobile device after connecting to the same wireless network access point, (4) assigning a security reputation to the wireless network access point based on the correlation, and (5) enabling at least one requesting mobile device to determine whether to connect to the wireless network access point by, before the requesting mobile device connects to the wireless network access point, providing the security reputation of the wireless network access point to the requesting mobile device. In this example, the security reputation may include a reputation score reflecting the likelihood of a security compromise on devices due to connecting to the wireless network access point.

In one embodiment, the unique identifier for the wireless network access point may include a physical address or a network address. Additionally or alternatively, the unique identifier may include a unique network name.

In some examples, the security posture may include an overall security plan based on a state of health of the mobile device. In these examples, the state of health of the mobile device may include an evaluation of a performance record, an infection report, and/or a security status. Additionally or alternatively, in other examples, the security posture may include a security event that occurred on the mobile device. In these examples, the security event may include a user of the mobile device receiving spam, compromise of the user's privacy, a change in a security setting, an unexpected activity on the mobile device, a malware infection, and/or an attack on the mobile device.

In some embodiments, correlating the security information with the additional set of security information may include determining a connection between the mobile device and the additional mobile device using a location of mobile devices connected to the wireless network access point and/or a length of time that mobile devices are connected to the wireless network access point. Additionally or alternatively, correlating the security information with the additional set of security information may include determining a connection using a number of devices connected to the wireless network access point.

In one example, the computer-implemented method may further include executing a security action in response to assigning a low security reputation to the wireless network access point. In this example, the security action may include blocking the requesting mobile device from connecting to the wireless network access point based on the low security reputation, suggesting an alternative wireless network access point with a higher security reputation to the requesting mobile device based on a location of the requesting mobile device, and/or sending a security alert to at least one mobile device that has previously connected to the wireless network access point about the low security reputation.

In one embodiment, a system for implementing the above-described method may include (1) a reception module, stored in memory, that receives, from at least one mobile device, a unique identifier for a wireless network access point to which the mobile device has connected and security information that identifies the security posture of the mobile device after connecting to the wireless network access point, (2) a database module, stored in memory, that adds both the unique identifier and the security information to a security database, (3) a correlation module, stored in memory, that correlates, using the unique identifier, the security information with at least one additional set of security information that identifies the security posture of at least one additional mobile device after connecting to the same wireless network access point, (4) an assignment module, stored in memory, that assigns a security reputation to the wireless network access point based on the correlation, and (5) a provision module, stored in memory, that enables at least one requesting mobile device to determine whether to connect to the wireless network access point by, before the requesting mobile device connects to the wireless network access point, providing the security reputation of the wireless network access point to the requesting mobile device. In addition, the system may include at least one processor that executes the reception module, the database module, the correlation module, the assignment module, and the provision module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (1) receive, from at least one mobile device, a unique identifier for a wireless network access point to which the mobile device has connected and security information that identifies the security posture of the mobile device after connecting to the wireless network access point, (2) add both the unique identifier and the security information to a security database, (3) correlate, using the unique identifier, the security information with at least one additional set of security information that identifies the security posture of at least one additional mobile device after connecting to the same wireless network access point, (4) assign a security reputation to the wireless network access point based on the correlation, and (5) enable at least one requesting mobile device to determine whether to connect to the wireless network access point by, before the requesting mobile device connects to the wireless network access point, providing the security reputation of the wireless network access point to the requesting mobile device.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of representative embodiments and are a part of the specification. Together with the following description, these drawings demonstrate and explain various principles of the instant disclosure.

Figure 1:
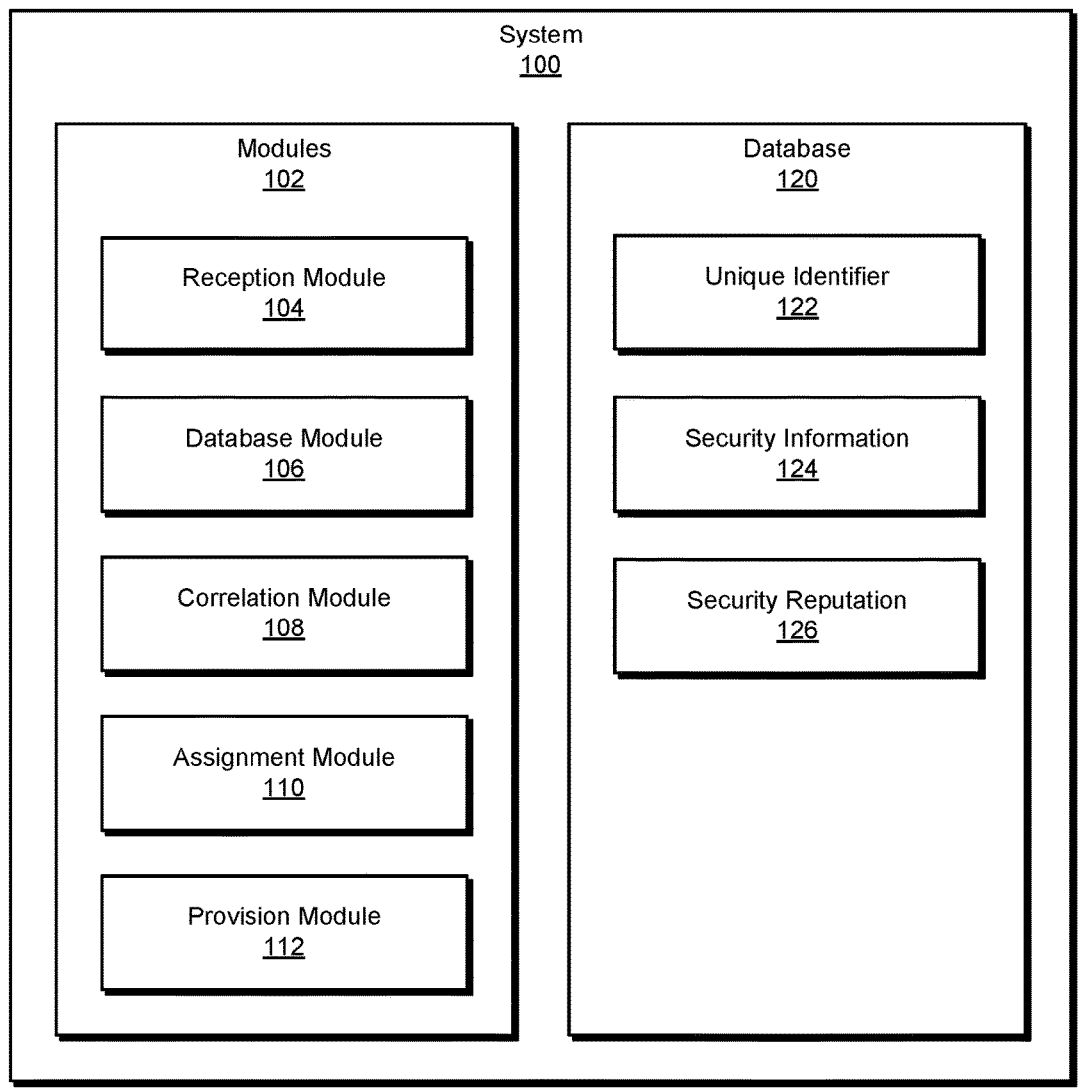
FIG. 1 is a block diagram of a representative system for determining security reputations of wireless network access points.

Throughout the drawings, identical reference characters and descriptions indicate similar, but not necessarily identical, elements. While the representative embodiments described herein are susceptible to various modifications and alternative forms, specific embodiments have been shown by way of example in the drawings and will be described in detail herein. However, the representative embodiments described herein are not intended to be limited to the particular forms disclosed. Rather, the instant disclosure covers all modifications, equivalents, and alternatives falling within the scope of the appended claims.

DETAILED DESCRIPTION OF REPRESENTATIVE EMBODIMENTS

The present disclosure is generally directed to systems and methods for determining security reputations of wireless network access points. As will be explained in greater detail below, by correlating security information from multiple mobile devices, the systems and methods disclosed herein may determine when a wireless network access point may pose a security threat. For example, by correlating similar security attacks on devices that have connected to the same access point, the disclosed systems and methods may determine the access point is the likely origin of the attacks. The disclosed systems and methods may then assign reputation scores to various wireless network access points based on the likelihood of a security threat.

Figure 2:
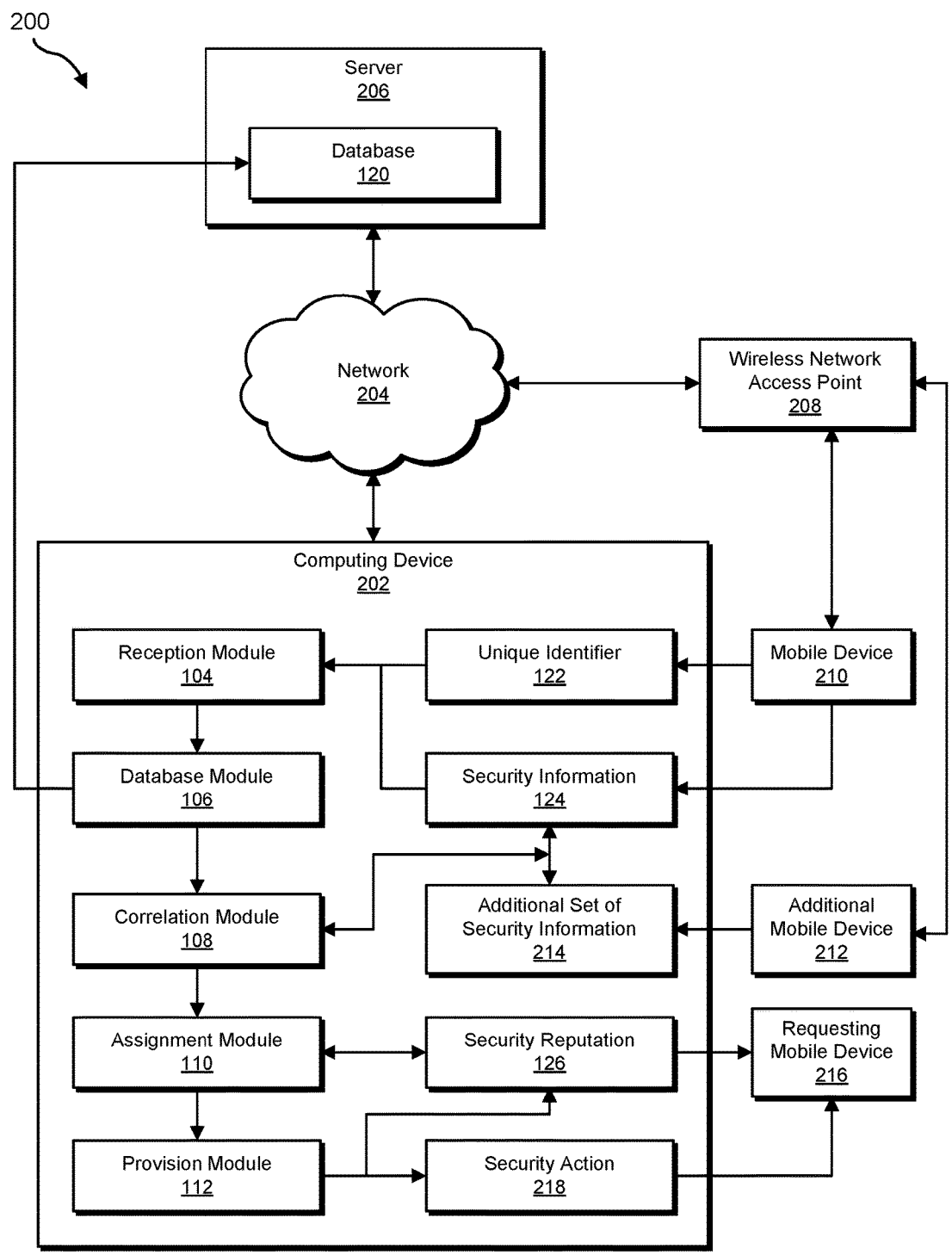
FIG. 2 is a block diagram of an additional representative system for determining security reputations of wireless network access points.

The following will provide, with reference to FIGS. 1 and 2, detailed descriptions of representative systems for determining security reputations of wireless network access points. Detailed descriptions of corresponding computer-implemented methods will also be provided in connection with FIG. 3. In addition, detailed descriptions of a representative correlation between representative sets of security information using a representative unique identifier will be provided in connection with FIG. 4. Furthermore, detailed descriptions of a representative computing system and network architecture capable of implementing one or more of the embodiments described herein will be provided in connection with FIGS. 5 and 6, respectively.

FIG. 1 is a block diagram of representative system 100 for determining security reputations of wireless network access points. The term "wireless network access point," as used herein, generally refers to a networking device that may allow other devices to connect to a wired network through the use of a wireless local area network (WLAN). In particular, wireless network access points may include WI-FI compliant devices and may be located at WI-FI hotspots.

As illustrated in FIG. 1, representative system 100 may include one or more modules 102 for performing one or more tasks. For example, and as will be explained in greater detail below, representative system 100 may also include a reception module 104 that may receive, from at least one mobile device, a unique identifier for a wireless network access point to which the mobile device has connected and security information that identifies the security posture of the mobile device after connecting to the wireless network access point. The term "mobile device," as used herein, generally refers to a portable computing device that may be carried to a WI-FI hotspot.

Representative system 100 may additionally include a database module 106 that may add both the unique identifier and the security information to a security database, such as database 120. Representative system 100 may also include a correlation module 108 that may correlate, using the unique identifier, the security information with at least one additional set of security information that identifies the security posture of at least one additional mobile device after connecting to the same wireless network access point. Representative system 100 may further include an assignment module 110 that may assign a security reputation to the wireless network access point based on the correlation. Finally, representative system 100 may include a provision module 112 that may enable at least one requesting mobile device to determine whether to connect to the wireless network access point by, before the requesting mobile device connects to the wireless network access point, providing the security reputation of the wireless network access point to the requesting mobile device. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., computing device 202 and/or server 206), computing system 510 in FIG. 5, and/or portions of representative network architecture 600 in FIG. 6. One or more of modules 102 in FIG. 1 may also represent all or portions of one or more special-purpose computers configured to perform one or more tasks.

As illustrated in FIG. 1, representative system 100 may also include one or more databases, such as database 120. In one example, database 120 may be configured to store a unique identifier 122, which may include identifying information for a wireless network access point, and security information 124, which may include security information for a mobile device after connecting to the wireless network access point. Database 120 may also be configured to store a security reputation 126, which may include a security score indicating the trustworthiness of the wireless network access point.

Database 120 may represent portions of a single database or computing device or a plurality of databases or computing devices. For example, database 120 may represent a portion of server 206 in FIG. 2, computing system 510 in FIG. 5, and/or portions of representative network architecture 600 in FIG. 6. Alternatively, database 120 in FIG. 1 may represent one or more physically separate devices capable of being accessed by a computing device, such as server 206 in FIG. 2, computing system 510 in FIG. 5, and/or portions of representative network architecture 600 in FIG. 6.

Representative system 100 in FIG. 1 may be implemented in a variety of ways. For example, all or a portion of system 100 may represent portions of system 200 in FIG. 2. As shown in FIG. 2, system 200 may include a computing device 202 in communication with a server 206 via a network 204. In one example, computing device 202 may be programmed with one or more of modules 102 and/or may store all or a portion of the data in database 120. Additionally or alternatively, server 206 may be programmed with one or more of modules 102 and/or may store all or a portion of the data in database 120. Similarly, both server 206 and computing device 202 may be merged into a single machine or computing system.

In one embodiment, one or more of modules 102 from FIG. 1 may, when executed by at least one processor of computing device 202 and/or server 206, enable computing device 202 and/or server 206 to identify a potential security threat due to a wireless network access point. For example, and as will be described in greater detail below, reception module 104 may receive, from at least one mobile device 210, unique identifier 122 for a wireless network access point 208 to which mobile device 210 has connected and security information 124 that identifies the security posture of mobile device 210 after connecting to wireless network access point 208. Database module 106 may add both unique identifier 122 and security information 124 to a security database 120. Correlation module 108 may correlate, using unique identifier 122, security information 124 with at least one additional set of security information 214 that identifies the security posture of at least one additional mobile device 212 after connecting to wireless network access point 208. Assignment module 110 may assign security reputation 126 to wireless network access point 208 based on the correlation. Provision module 112 may enable at least one requesting mobile device 216 to determine whether to connect to wireless network access point 208 by, before requesting mobile device 216 connects to wireless network access point 208, providing security reputation 126 of wireless network access point 208 to requesting mobile device 216.

In the example of FIG. 2, and as will be explained in greater detail below, computing device 202 may first receive unique identifier 122 and security information 124 from mobile device 210 via network 204 after mobile device 210 has connected to wireless network access point 208. Computing device 202 may then add unique identifier 122 and security information 124 to database 120 on server 206 via network 204. Next, computing device 202 may identify additional set of security information 214 received from additional mobile device 212 that has also connected to wireless network access point 208 and may correlate additional set of security information 214 with security information 124. Furthermore, computing device 202 may assign security reputation 126 to wireless network access point 208 based on correlating security information 124 and additional set of security information 214. Finally, computing device 202 may send security reputation 126 to requesting mobile device 216 before requesting mobile device 216 connects to wireless network access point 208. Computing device 202 may subsequently also perform a security action 218 to prevent requesting mobile device 216 from connecting to wireless network access point 208 with low security reputation 126.

Computing device 202 generally represents any type or form of computing device capable of reading computer-executable instructions. Examples of computing device 202 include, without limitation, laptops, tablets, desktops, servers, cellular phones, Personal Digital Assistants (PDAs), multimedia players, embedded systems, wearable devices (e.g., smart watches, smart glasses, etc.), gaming consoles, combinations of one or more of the same, representative computing system 510 in FIG. 5, or any other suitable computing device.

Server 206 generally represents any type or form of computing device that is capable of storing and/or managing information about wireless network access points and the security of mobile devices. Examples of server 206 include, without limitation, application servers and database servers configured to provide various database services and/or run certain software applications.

Figure 6:
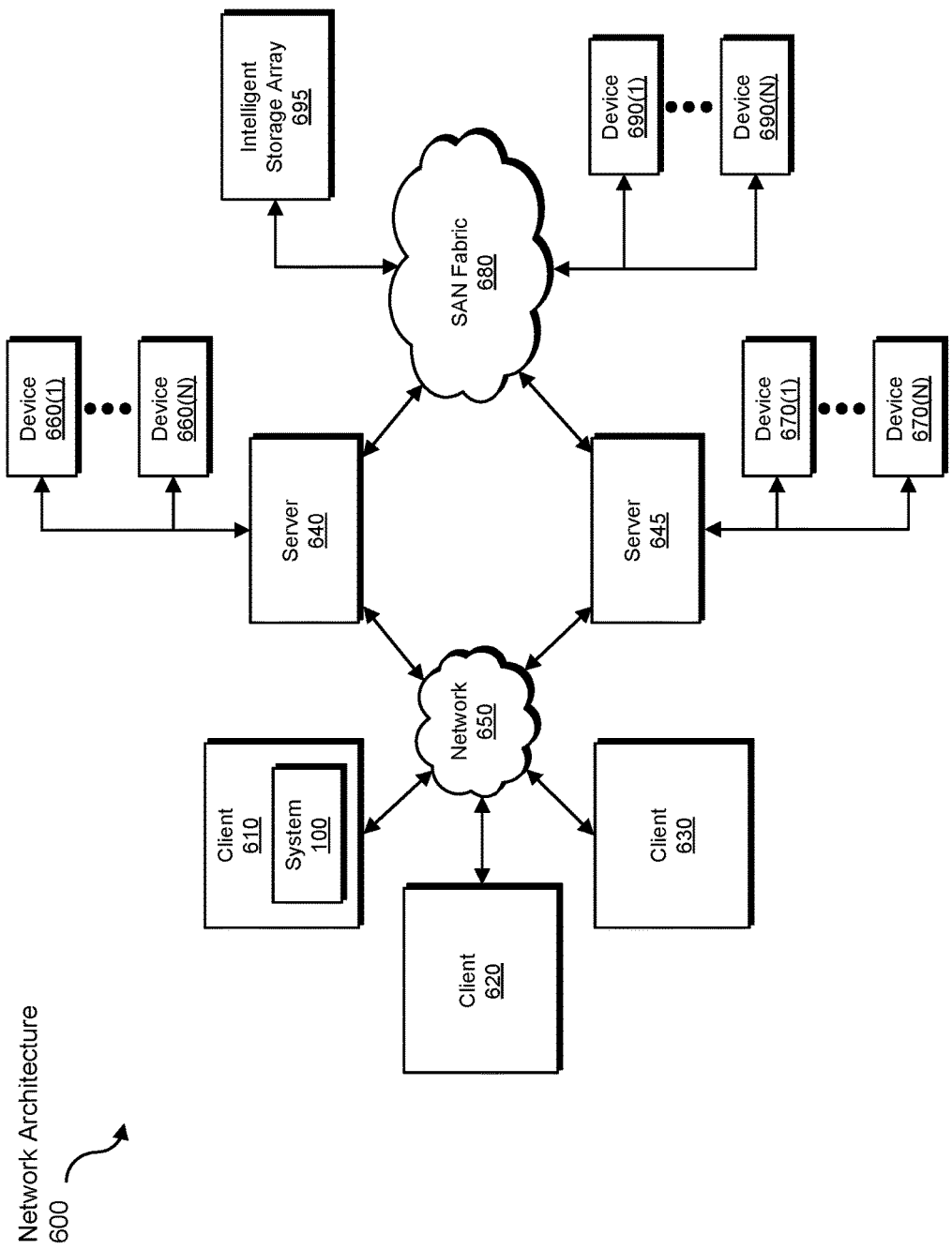
FIG. 6 is a block diagram of a representative computing network capable of implementing one or more of the embodiments described and/or illustrated herein.

Network 204 generally represents any medium or architecture capable of facilitating communication or data transfer. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM)

network), representative network architecture 600 in FIG. 6, or the like. Network 204 may facilitate communication or data transfer using wireless or wired connections. In one embodiment, network 204 may facilitate communication between computing device 202 and server 206.

Figure 3:
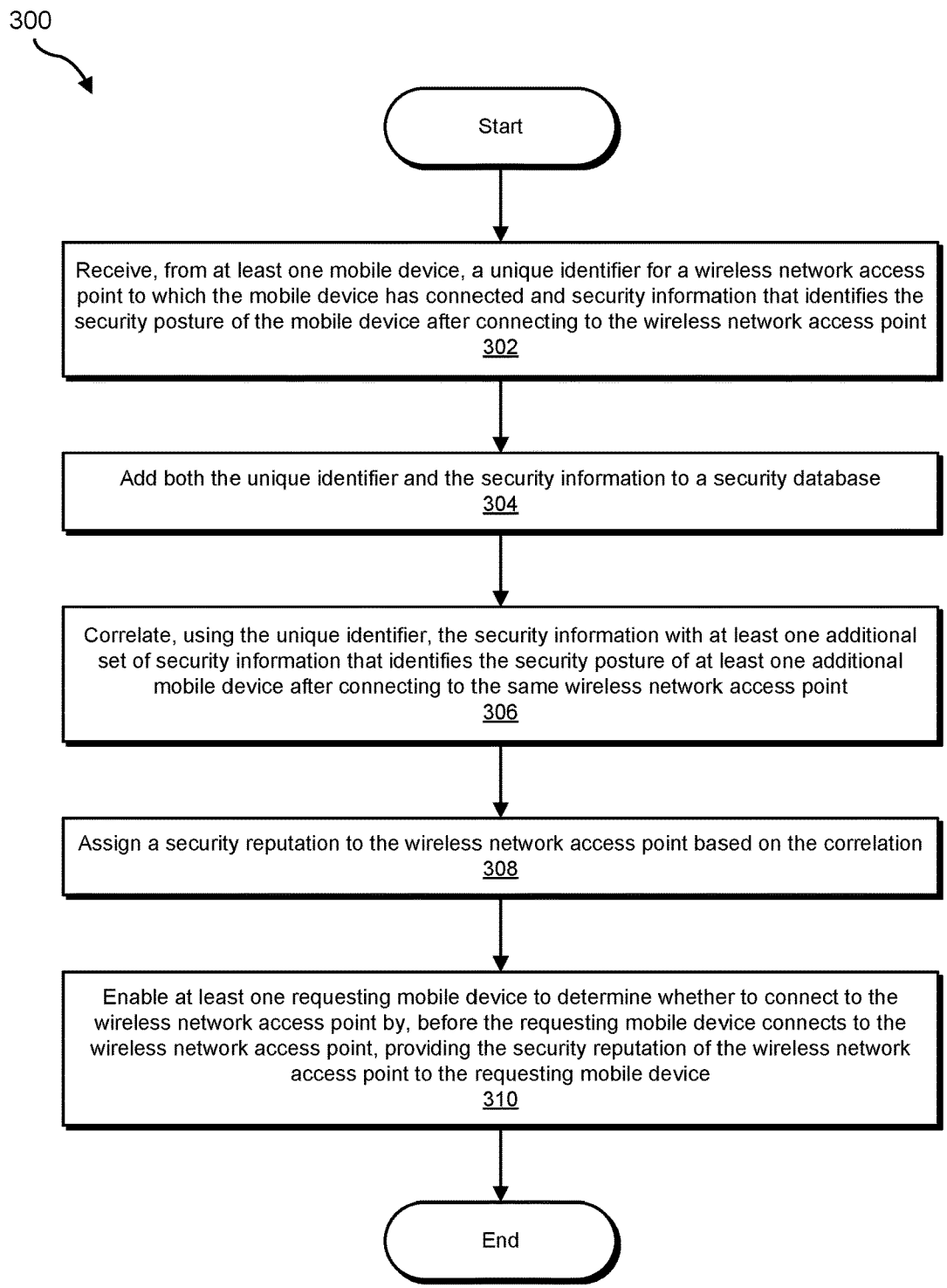
FIG. 3 is a flow diagram of a representative method for determining security reputations of wireless network access points.

FIG. 3 is a flow diagram of a representative computer-implemented method 300 for determining security reputations of wireless network access points. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 510 in FIG. 5, and/or portions of representative network architecture 600 in FIG. 6.

As illustrated in FIG. 3, at step 302, one or more of the systems described herein may receive, from at least one mobile device, a unique identifier for a wireless network access point to which the mobile device has connected and security information that identifies the security posture of the mobile device after connecting to the wireless network access point. For example, reception module 104 may, as part of computing device 202 in FIG. 2, receive, from at least one mobile device 210, unique identifier 122 for a wireless network access point 208 to which mobile device 210 has connected and security information 124 that identifies the security posture of mobile device 210 after connecting to wireless network access point 208.

Reception module 104 may receive unique identifier 122 and security information 124 in a variety of ways. In one embodiment, unique identifier 122 may include a physical address, a network address, and/or a unique network name of wireless network access point 208. For example, unique identifier 122 may include a media access control (MAC) address, an internet protocol (IP) address, a universal unique identifier (UID), a service set identifier (SSID), or any other suitable identifier or combination of identifiers that may distinguish the wireless network access point 208. Furthermore, in some embodiments, wireless network access point 208 may connect to or facilitate a connection to network 204, which may be the Internet.

In another embodiment, the security posture of mobile device 210 may include an overall security plan based on a state of health of mobile device 210 and/or a security event that occurred on mobile device 210. In this embodiment, the state of health of the mobile device may include an evaluation of a performance record, an infection report, and/or a security status. Furthermore, in this embodiment, the security event that occurred on mobile device 210 may include a user of mobile device 210 receiving spam, compromise of the user's privacy, a change in a security setting, an unexpected activity on mobile device 210, a malware infection, and/or an attack on mobile device 210. For example, the security event may include the user of mobile device 210 attempting to download a file when connected to wireless network access point 208 but unexpectedly receiving a different file. As another example, the security event may include an unexpected change to a lower security setting on mobile device 210.

Figure 4:
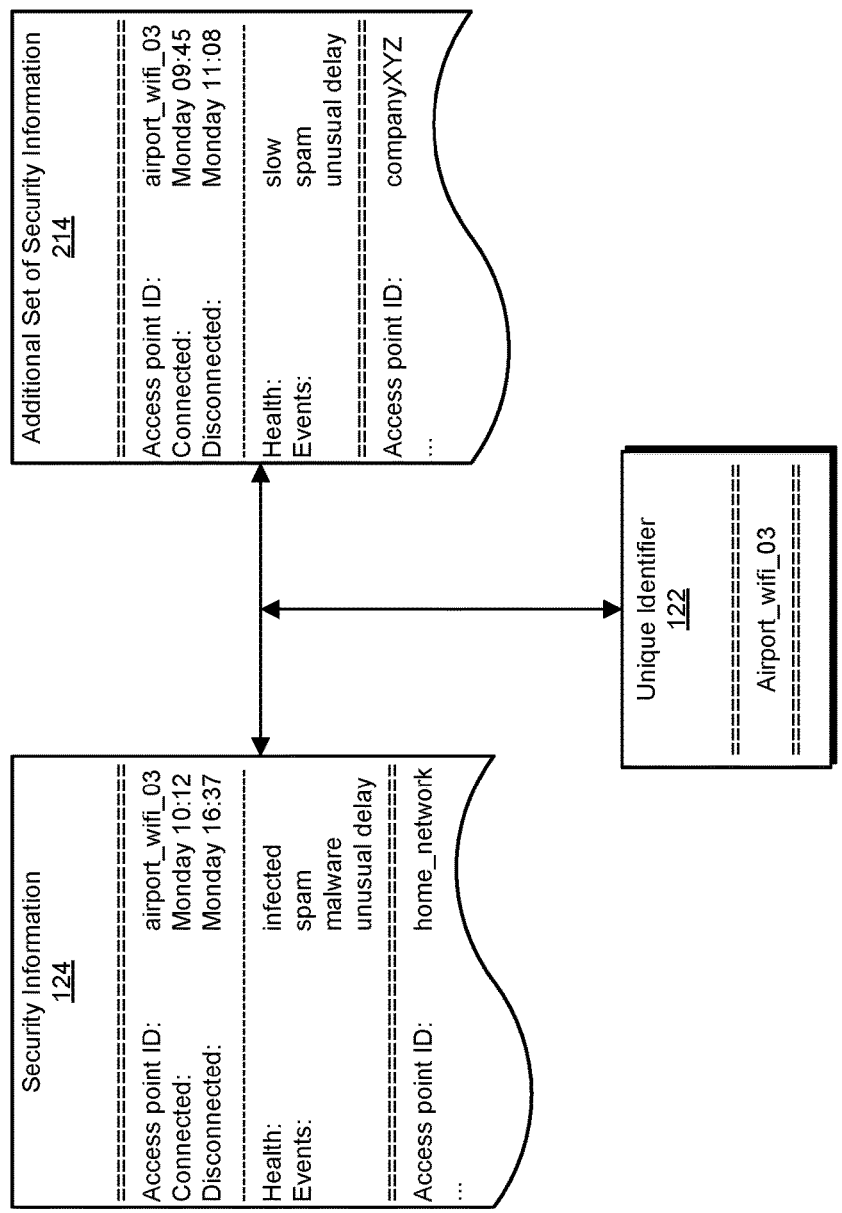
FIG. 4 is a block diagram of a representative correlation between representative sets of security information using a representative unique identifier.

For example, as shown in FIG. 4, unique identifier 122 may include a unique network name for a WLAN (e.g., "Airport_wifi_03"). Additionally, security information 124 may include a general health of mobile device 210 (e.g., "infected") and security events that have occurred on mobile device 210 after connecting to wireless network access point 208 (e.g., "spam," "malware," and "unusual delay"). In other examples, security information 124 may also include timing of security events, such as when events are detected, and/or a relation of the timing to the connection to wireless network access point 208.

In one example, mobile device 210 may send unique identifier 122 and security information 124 to computing device 202 through network 204 while connected to wireless network access point 208. Alternatively, in another example, mobile device 210 may send unique identifier 122 and security information 124 via another access point or directly through network 204 after disconnecting from wireless network access point 208. Mobile device 210 may also send unique identifier 122 and security information 124 in response to detecting a security posture change or a security event or based on a predetermined schedule, such as a periodic update.

Returning to FIG. 3, at step 304, one or more of the systems described herein may add both the unique identifier and the security information to a security database. For example, database module 106 may, as part of computing device 202 in FIG. 2, add both unique identifier 122 and security information 124 to database 120.

Database module 106 may add unique identifier 122 and security information 124 to database 120 in a variety of ways. In the example of FIG. 2, database module 106 may transmit unique identifier 122 and security information 124 to server 206 via network 204. In other examples, database 120 may reside on computing device 202. Furthermore, database module 106 may add unique identifier 122 and security information 124 when mobile device 210 sends the data to computing device 202. Alternatively, database module 106 may add unique identifier 122 and security information 124 when security reputation 126 is requested by requesting mobile device 216.

Returning to FIG. 3, at step 306, one or more of the systems described herein may correlate, using the unique identifier, the security information with at least one additional set of security information that identifies the security posture of at least one additional mobile device after connecting to the same wireless network access point. For example, correlation module 108 may, as part of computing device 202 in FIG. 2, correlate, using unique identifier 122, security information 124 with additional set of security information 214 that identifies the security posture of additional mobile device 212 after connecting to wireless network access point 208.

Correlation module 108 may correlate security information 124 with additional set of security information 214 in a variety of ways. In some examples, correlation module 108 may correlate security information 124 with additional set of security information 214 by determining a connection between mobile device 210 and additional mobile device 212 using a location of mobile devices connected to wireless network access point 208, a length of time that mobile devices are connected to wireless network access point 208, and/or a number of devices connected to wireless network access point 208.

For example, security information 124 and additional set of security information 214 may both include fraud or identity theft reported by users of mobile device 210 and additional mobile device 212 after connecting to wireless network access point 208 during the same time period. As another example, security information 124 and additional set of security information 214 may include similar cases of man-in-the-middle attacks on the respective mobile devices during connections to wireless network access point 208 in the same location. Correlation module 108 may further correlate security information from other mobile devices that have also connected to wireless network access point 208 to determine, based on the timing and/or location of the connection and security events, that wireless network access point 208 may be a factor in the security events and, therefore, pose a security threat.

In the example of FIG. 4, correlation module 108 may initially compare security information 124 and additional set of security information 214 based on detecting unique identifier 122 in both. Correlation module 108 may then strongly correlate security information 124 and additional set of security information 214 based on similar connection times to wireless network access point 208 and similar security events detected on both mobile devices. Correlation module 108 may then attribute the similar security events to connecting to wireless network access point 208.

Additionally, in some examples, additional set of security information 214 may already be in database 120. Alternatively, additional set of security information 214 may be received from additional mobile device 212 and stored in database 120 when correlation module 108 requests all security information including unique identifier 122. In further examples, correlation module 108 may also automatically determine the security posture of mobile device 210 and additional mobile device 212 based on an evaluation of security events. Correlation module 108 may use predefined rules and/or evolving algorithms to correlate security postures to wireless network access point 208.

Returning to FIG. 3, at step 308, one or more of the systems described herein may assign a security reputation to the wireless network access point based on the correlation. For example, assignment module 110 may, as part of computing device 202 in FIG. 2, assign security reputation 126 to wireless network access point 208 based on the correlation.

Assignment module 110 may assign security reputation 126 in a variety of ways. In one embodiment, security reputation 126 may include a reputation score reflecting the likelihood of a security compromise on devices due to connecting to wireless network access point 208. For example, a wireless network access point that is associated with multiple security events on multiple mobile devices may have a very low reputation score, and another wireless network access point not correlated with any security events may have a very high reputation score. Assignment module 110 may then store security reputation 126 and other security reputations of other wireless network access points in database 120. In another embodiment, wireless network access point 208 may already have a security reputation, and assignment module 110 may replace the previous security reputation with updated security reputation 126.

Returning to FIG. 3, at step 310, one or more of the systems described herein may enable at least one requesting mobile device to determine whether to connect to the wireless network access point by, before the requesting mobile device connects to the wireless network access point, providing the security reputation of the wireless network access point to the requesting mobile device. For example, provision module 112 may, as part of computing device 202 in FIG. 2, enable at least one requesting mobile device 216 to determine whether to connect to wireless network access point 208 by, before requesting mobile device 216 connects to wireless network access point 208, providing security reputation 126 of wireless network access point 208 to requesting mobile device 216.

Provision module 112 may enable requesting mobile device 216 to determine whether to connect to wireless network access point 208 in a variety of ways. In some embodiments, requesting mobile device 216 may initially connect to network 204 via an alternate connection method, such as through a cellular network. Alternatively, requesting mobile device 216 may be using a network connection with low speed. A user of requesting mobile device 216 may prefer to switch to wireless network access point 208 and request security reputation 126. In other embodiments, provision module 112 may automatically send security reputation 126 to requesting mobile device 216 after detecting an attempt to connect to wireless network access point 208.

In some examples, the systems described herein may further include executing security action 218 in response to assigning low security reputation 126 to wireless network access point 208. In these example, security action 218 may include blocking requesting mobile device 216 from connecting to wireless network access point 208 based on low security reputation 126 and/or suggesting an alternative wireless network access point with a higher security reputation to requesting mobile device 216 based on a location of requesting mobile device 216. Additionally or alternatively, security action 218 may include sending a security alert to at least one mobile device that has previously connected to wireless network access point 208, such as mobile device 210 and/or additional mobile device 212, about low security reputation 126.

As explained above in connection with method 300 in FIG. 3, the disclosed systems and methods may, by correlating security information from mobile devices with identifying information about a wireless network access point to which the devices connected, determine the security risk of the access point. Specifically, the disclosed systems and methods may first collect connection information from devices that have connected to the wireless network access point. For example, the systems and methods described herein may collect information on the physical address of the wireless network access point, a number of devices connected to the access point, the timing of the connections, and the locations of the connected devices. In addition, the disclosed systems and methods may also collect security information that may indicate potential attacks or security threats to the devices after having connected to the wireless network access point. For example, the systems and methods described herein may obtain information about a malware infection on the user's device that occurred during a period when the device was connected to the wireless network access point.

The disclosed systems and methods may then determine a risk of security issues in connection with the wireless network access point by correlating the timing of security threats on mobile devices with the devices' connection to the wireless network access point. Additionally, the disclosed systems and methods may assign a reputation score to the wireless network access point based the likelihood that the security threats originated from the wireless network access point. Users who then request information about the wireless network access point may receive the reputation score and may then select a wireless network access point by choosing the highest reputation score among multiple wireless network access points or opting to not connect to a wireless network access point with a low reputation score.

As detailed above, by collecting and examining security data from mobile devices, the disclosed systems and methods may determine whether security issues are due to wireless network access points to which the mobile devices have connected. In addition, by assigning a reputation score to each wireless network access point, the disclosed systems and methods may alert other mobile devices of potentially dangerous access points. Thus, the systems and methods described herein may improve the security of mobile devices when connecting to open wireless network access points.

Figure 5:
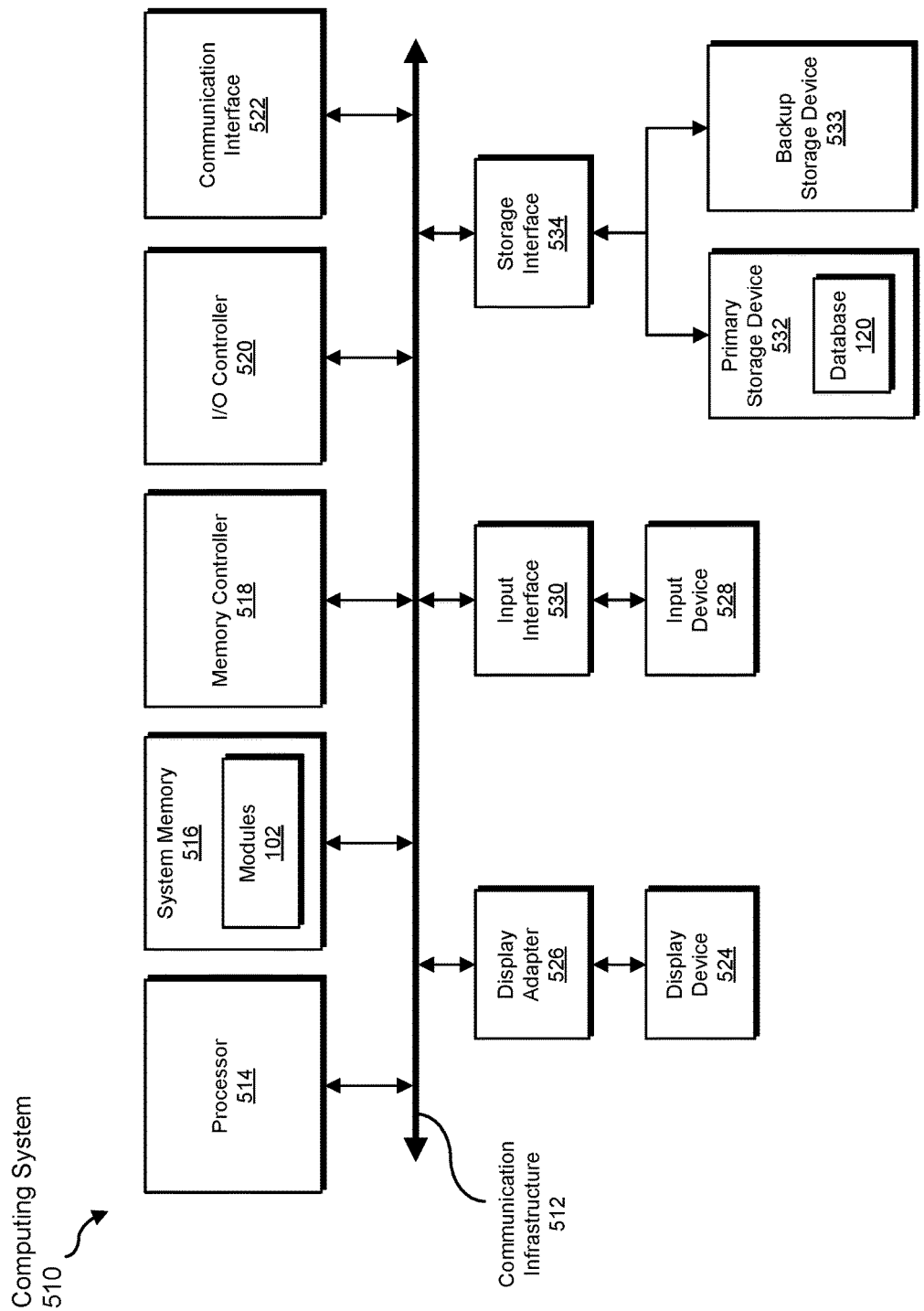
FIG. 5 is a block diagram of a representative computing system capable of implementing one or more of the embodiments described and/or illustrated herein.

FIG. 5 is a block diagram of a representative computing system 510 capable of implementing one or more of the embodiments described and/or illustrated herein. For example, all or a portion of computing system 510 may perform and/or be a means for performing, either alone or in combination with other elements, one or more of the steps described herein (such as one or more of the steps illustrated in FIG. 3). All or a portion of computing system 510 may also perform and/or be a means for performing any other steps, methods, or processes described and/or illustrated herein.

Computing system 510 broadly represents any single or multi-processor computing device or system capable of executing computer-readable instructions. Examples of computing system 510 include, without limitation, workstations, laptops, client-side terminals, servers, distributed computing systems, handheld devices, or any other computing system or device. In its most basic configuration, computing system 510 may include at least one processor 514 and a system memory 516.

Processor 514 generally represents any type or form of physical processing unit (e.g., a hardware-implemented central processing unit) capable of processing data or interpreting and executing instructions. In certain embodiments, processor 514 may receive instructions from a software application or module. These instructions may cause processor 514 to perform the functions of one or more of the representative embodiments described and/or illustrated herein.

System memory 516 generally represents any type or form of volatile or non-volatile storage device or medium capable of storing data and/or other computer-readable instructions. Examples of system memory 516 include, without limitation, Random Access Memory (RAM), Read Only Memory (ROM), flash memory, or any other suitable memory device. Although not required, in certain embodiments computing system 510 may include both a volatile memory unit (such as, for example, system memory 516) and a non-volatile storage device (such as, for example, primary storage device 532, as described in detail below). In one example, one or more of modules 102 from FIG. 1 may be loaded into system memory 516.

In certain embodiments, representative computing system 510 may also include one or more components or elements in addition to processor 514 and system memory 516. For example, as illustrated in FIG. 5, computing system 510 may include a memory controller 518, an Input/Output (I/O) controller 520, and a communication interface 522, each of which may be interconnected via a communication infrastructure 512. Communication infrastructure 512 generally represents any type or form of infrastructure capable of facilitating communication between one or more components of a computing device. Examples of communication infrastructure 512 include, without limitation, a communication bus (such as an Industry Standard Architecture (ISA), Peripheral Component Interconnect (PCI), PCI Express (PCIe), or similar bus) and a network.

Memory controller 518 generally represents any type or form of device capable of handling memory or data or controlling communication between one or more components of computing system 510. For example, in certain embodiments memory controller 518 may control communication between processor 514, system memory 516, and I/O controller 520 via communication infrastructure 512.

I/O controller 520 generally represents any type or form of module capable of coordinating and/or controlling the input and output functions of a computing device. For example, in certain embodiments I/O controller 520 may control or facilitate transfer of data between one or more elements of computing system 510, such as processor 514, system memory 516, communication interface 522, display adapter 526, input interface 530, and storage interface 534.

Communication interface 522 broadly represents any type or form of communication device or adapter capable of facilitating communication between representative computing system 510 and one or more additional devices. For example, in certain embodiments communication interface 522 may facilitate communication between computing system 510 and a private or public network including additional computing systems. Examples of communication interface 522 include, without limitation, a wired network interface (such as a network interface card), a wireless network interface (such as a wireless network interface card), a modem, and any other suitable interface. In at least one embodiment, communication interface 522 may provide a direct connection to a remote server via a direct link to a network, such as the Internet. Communication interface 522 may also indirectly provide such a connection through, for example, a local area network (such as an Ethernet network), a personal area network, a telephone or cable network, a cellular telephone connection, a satellite data connection, or any other suitable connection.

In certain embodiments, communication interface 522 may also represent a host adapter configured to facilitate communication between computing system 510 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 522 may also allow computing system 510 to engage in distributed or remote computing. For example, communication interface 522 may receive instructions from a remote device or send instructions to a remote device for execution.

As illustrated in FIG. 5, computing system 510 may also include at least one display device 524 coupled to communication infrastructure 512 via a display adapter 526. Display device 524 generally represents any type or form of device capable of visually displaying information forwarded by display adapter 526. Similarly, display adapter 526 generally represents any type or form of device configured to forward graphics, text, and other data from communication infrastructure 512 (or from a frame buffer, as known in the art) for display on display device 524.

As illustrated in FIG. 5, representative computing system 510 may also include at least one input device 528 coupled to communication infrastructure 512 via an input interface 530. Input device 528 generally represents any type or form of input device capable of providing input, either computer or human generated, to representative computing system 510. Examples of input device 528 include, without limitation, a keyboard, a pointing device, a speech recognition device, or any other input device.

As illustrated in FIG. 5, representative computing system 510 may also include a primary storage device 532 and a backup storage device 533 coupled to communication infrastructure 512 via a storage interface 534. Storage devices 532 and 533 generally represent any type or form of storage device or medium capable of storing data and/or other computer-readable instructions. For example, storage devices 532 and 533 may be a magnetic disk drive (e.g., a so-called hard drive), a solid state drive, a floppy disk drive, a magnetic tape drive, an optical disk drive, a flash drive, or the like. Storage interface 534 generally represents any type or form of interface or device for transferring data between storage devices 532 and 533 and other components of computing system 510. In one example, database 120 from FIG. 1 may be stored in primary storage device 532.

In certain embodiments, storage devices 532 and 533 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 532 and 533 may also include other similar structures or devices for allowing computer software, data, or other computer-readable instructions to be loaded into computing system 510. For example, storage devices 532 and 533 may be configured to read and write software, data, or other computer-readable information. Storage devices 532 and 533 may also be a part of computing system 510 or may be a separate device accessed through other interface systems.

Many other devices or subsystems may be connected to computing system 510. Conversely, all of the components and devices illustrated in FIG. 5 need not be present to practice the embodiments described and/or illustrated herein. The devices and subsystems referenced above may also be interconnected in different ways from that shown in FIG. 5. Computing system 510 may also employ any number of software, firmware, and/or hardware configurations. For example, one or more of the representative embodiments disclosed herein may be encoded as a computer program (also referred to as computer software, software applications, computer-readable instructions, or computer control logic) on a computer-readable medium. The phrase "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 510. All or a portion of the computer program stored on the computer-readable medium may then be stored in system memory 516 and/or various portions of storage devices 532 and 533. When executed by processor 514, a computer program loaded into computing system 510 may cause processor 514 to perform and/or be a means for performing the functions of one or more of the representative embodiments described and/or illustrated herein. Additionally or alternatively, one or more of the representative embodiments described and/or illustrated herein may be implemented in firmware and/or hardware. For example, computing system 510 may be configured as an Application Specific Integrated Circuit (ASIC) adapted to implement one or more of the representative embodiments disclosed herein.

FIG. 6 is a block diagram of a representative network architecture 600 in which client systems 610, 620, and 630 and servers 640 and 645 may be coupled to a network 650. As detailed above, all or a portion of network architecture 600 may perform and/or be a means for performing, either alone or in combination with other elements, one or more of the steps disclosed herein (such as one or more of the steps illustrated in FIG. 3). All or a portion of network architecture 600 may also be used to perform and/or be a means for performing other steps and features set forth in the instant disclosure.

Client systems 610, 620, and 630 generally represent any type or form of computing device or system, such as representative computing system 510 in FIG. 5. Similarly, servers 640 and 645 generally represent computing devices or systems, such as application servers or database servers, configured to provide various database services and/or run certain software applications. Network 650 generally represents any telecommunication or computer network including, for example, an intranet, a WAN, a LAN, a PAN, or the Internet. In one example, client systems 610, 620, and/or 630 and/or servers 640 and/or 645 may include all or a portion of system 100 from FIG. 1.

As illustrated in FIG. 6, one or more storage devices 660(1)-(N) may be directly attached to server 640. Similarly, one or more storage devices 670(1)-(N) may be directly attached to server 645. Storage devices 660(1)-(N) and storage devices 670(1)-(N) generally represent any type or form of storage device or medium capable of storing data and/or other computer-readable instructions. In certain embodiments, storage devices 660(1)-(N) and storage devices 670(1)-(N) may represent Network-Attached Storage (NAS) devices configured to communicate with servers 640 and 645 using various protocols, such as Network File System (NFS), Server Message Block (SMB), or Common Internet File System (CIFS).

Servers 640 and 645 may also be connected to a Storage Area Network (SAN) fabric 680. SAN fabric 680 generally represents any type or form of computer network or architecture capable of facilitating communication between a plurality of storage devices. SAN fabric 680 may facilitate communication between servers 640 and 645 and a plurality of storage devices 690(1)-(N) and/or an intelligent storage array 695. SAN fabric 680 may also facilitate, via network 650 and servers 640 and 645, communication between client systems 610, 620, and 630 and storage devices 690(1)-(N) and/or intelligent storage array 695 in such a manner that devices 690(1)-(N) and array 695 appear as locally attached devices to client systems 610, 620, and 630. As with storage devices 660(1)-(N) and storage devices 670(1)-(N), storage devices 690(1)-(N) and intelligent storage array 695 generally represent any type or form of storage device or medium capable of storing data and/or other computer-readable instructions.

In certain embodiments, and with reference to representative computing system 510 of FIG. 5, a communication interface, such as communication interface 522 in FIG. 5, may be used to provide connectivity between each client system 610, 620, and 630 and network 650. Client systems 610, 620, and 630 may be able to access information on server 640 or 645 using, for example, a web browser or other client software. Such software may allow client systems 610, 620, and 630 to access data hosted by server 640, server 645, storage devices 660(1)-(N), storage devices 670(1)-(N), storage devices 690(1)-(N), or intelligent storage array 695. Although FIG. 6 depicts the use of a network (such as the Internet) for exchanging data, the embodiments described and/or illustrated herein are not limited to the Internet or any particular network-based environment.

In at least one embodiment, all or a portion of one or more of the representative embodiments disclosed herein may be encoded as a computer program and loaded onto and executed by server 640, server 645, storage devices 660(1)-(N), storage devices 670(1)-(N), storage devices 690(1)-(N), intelligent storage array 695, or any combination thereof. All or a portion of one or more of the representative embodiments disclosed herein may also be encoded as a computer program, stored in server 640, run by server 645, and distributed to client systems 610, 620, and 630 over network 650.

As detailed above, computing system 510 and/or one or more components of network architecture 600 may perform and/or be a means for performing, either alone or in combination with other elements, one or more steps of a representative method for determining security reputations of wireless network access points.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered representative in nature since many other architectures can be implemented to achieve the same functionality.

In some examples, all or a portion of system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of representative system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of representative system 100 in FIG. 1 may be implemented within a virtual environment. For example, the modules and/or data described herein may reside and/or execute within a virtual machine. As used herein, the phrase "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the phrase "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of system 100 in FIG. 1 may represent portions of, interact with, consume data produced by, and/or produce data consumed by one or more systems for information management. As used herein, the phrase "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of system 100 in FIG. 1 may represent portions of, produce data protected by, and/or communicate with one or more systems for information security. As used herein, the phrase "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of system 100 in FIG. 1 may represent portions of, communicate with, and/or receive protection from one or more systems for endpoint security. As used herein, the phrase "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various representative methods described and/or illustrated herein may also omit one or more of the steps described or illustrated herein or include additional steps in addition to those disclosed.

While various embodiments have been described and/or illustrated herein in the context of fully functional computing systems, one or more of these representative embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the representative embodiments disclosed herein.

In addition, one or more of the modules described herein may transform data, physical devices, and/or representations of physical devices from one form to another. For example, one or more of the modules recited herein may receive security information to be transformed, transform the security information, output a result of the transformation to a storage or output device, use the result of the transformation to correlate a security event with a wireless network access point, and store the result of the transformation in a server or database. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the representative embodiments disclosed herein. This representative description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for determining security reputations of wireless network access points, at least a portion of the method being performed by a computing device comprising at least one processor, the method comprising:
   receiving, from a mobile device:
      a unique identifier for a wireless network access point to which the mobile device has connected; and
      security information that identifies a security posture of the mobile device after connecting to the wireless network access point, wherein the security posture comprises an overall security plan of the mobile device;
   adding both the unique identifier and the security information to a security database;
   correlating, using the unique identifier, the security information with at least one additional set of security information that identifies the security posture of an additional mobile device after connecting to the same wireless network access point, wherein the correlation comprises determining a similarity between the security posture of the mobile device and the security posture of the additional mobile device;
   assigning a security reputation to the wireless network access point based on the similarity between the security posture of the mobile device and the security posture of the additional mobile device; and
   enabling a requesting mobile device to determine whether to connect to the wireless network access point by, before the requesting mobile device connects to the wireless network access point, providing the security reputation of the wireless network access point to the requesting mobile device.

2. The method of claim 1, wherein the security posture comprises an overall security plan based on at least one of:
   a state of health of the mobile device; and
   a security event that occurred on the mobile device.

3. The method of claim 2, wherein the state of health of the mobile device comprises an evaluation of at least one of:
   a performance record;
   an infection report; and
   a security status.

4. The method of claim 2, wherein the security event comprises at least one of:
   a user of the mobile device receiving spam;
   compromise of the user's privacy;
   a change in a security setting;
   an unexpected activity on the mobile device;
   a malware infection; and
   an attack on the mobile device.

5. The method of claim 1, wherein correlating the security information with the additional set of security information comprises determining a connection between the mobile device and the additional mobile device using at least one of:
   a location of mobile devices connected to the wireless network access point;
   a length of time that mobile devices are connected to the wireless network access point; and
   a number of devices connected to the wireless network access point.

6. The method of claim 1, wherein the security reputation comprises a reputation score reflecting the likelihood of a security compromise on devices due to connecting to the wireless network access point.

7. The method of claim 1, further comprising executing a security action in response to assigning a low security reputation to the wireless network access point.

8. The method of claim 7, wherein the security action comprises at least one of:
   blocking the requesting mobile device from connecting to the wireless network access point based on the low security reputation;

suggesting an alternative wireless network access point with a higher security reputation to the requesting mobile device based on a location of the requesting mobile device; and sending a security alert to at least one mobile device that has previously connected to the wireless network access point about the low security reputation.

9. The method of claim 8, wherein the unique identifier for the wireless network access point comprises at least one of:
 a physical address;
 a network address; and
 a unique network name.

10. A system for determining security reputations of wireless network access points, the system comprising:
 a reception module, stored in memory, that receives, from a mobile device:
  a unique identifier for a wireless network access point to which the mobile device has connected; and
  security information that identifies a security posture of the mobile device after connecting to the wireless network access point, wherein the security posture comprises an overall security plan of the mobile device;
 a database module, stored in memory, that adds both the unique identifier and the security information to a security database;
 a correlation module, stored in memory, that correlates, using the unique identifier, the security information with at least one additional set of security information that identifies the security posture of an additional mobile device after connecting to the same wireless network access point, wherein the correlation comprises determining a similarity between the security posture of the mobile device and the security posture of the additional mobile device;
 an assignment module, stored in memory, that assigns a security reputation to the wireless network access point based on the similarity between the security posture of the mobile device and the security posture of the additional mobile device;
 a provision module, stored in memory, that enables a requesting mobile device to determine whether to connect to the wireless network access point by, before the requesting mobile device connects to the wireless network access point, providing the security reputation of the wireless network access point to the requesting mobile device; and
 at least one processor that executes the reception module, the database module, the correlation module, the assignment module, and the provision module.

11. The system of claim 10, wherein the unique identifier for the wireless network access point comprises at least one of:
 a physical address;
 a network address; and
 a unique network name.

12. The system of claim 10, wherein the security posture comprises an overall security plan based on at least one of:
 a state of health of the mobile device; and
 a security event that occurred on the mobile device.

13. The system of claim 12, wherein the state of health of the mobile device comprises an evaluation of at least one of:
 a performance record;
 an infection report; and
 a security status.

14. The system of claim 12, wherein the security event comprises at least one of:
 a user of the mobile device receiving spam;
 compromise of the user's privacy;
 a change in a security setting;
 an unexpected activity on the mobile device;
 a malware infection; and
 an attack on the mobile device.

15. The system of claim 10, wherein the correlation module correlates the security information with the additional set of security information by determining a connection between the mobile device and the additional mobile device using at least one of:
 a location of mobile devices connected to the wireless network access point;
 a length of time that mobile devices are connected to the wireless network access point; and
 a number of devices connected to the wireless network access point.

16. The system of claim 10, wherein the security reputation comprises a reputation score reflecting the likelihood of a security compromise on devices due to connecting to the wireless network access point.

17. The system of claim 10, further comprising executing a security action in response to assigning a low security reputation to the wireless network access point.

18. The system of claim 17, wherein the security action comprises at least one of:
 blocking the requesting mobile device from connecting to the wireless network access point based on the low security reputation;
 suggesting an alternative wireless network access point with a higher security reputation to the requesting mobile device based on a location of the requesting mobile device; and
 sending a security alert to at least one mobile device that has previously connected to the wireless network access point about the low security reputation.

19. A non-transitory computer-readable medium comprising one or more computer-executable instructions that, when executed by at least one processor of a computing device, cause the computing device to:
 receive, from a mobile device:
  a unique identifier for a wireless network access point to which the mobile device has connected; and
  security information that identifies a security posture of the mobile device after connecting to the wireless network access point, wherein the security posture comprises an overall security plan of the mobile device;
 add both the unique identifier and the security information to a security database;
 correlate, using the unique identifier, the security information with at least one additional set of security information that identifies the security posture of an additional mobile device after connecting to the same wireless network access point, wherein the correlation comprises determining a similarity between the security posture of the mobile device and the security posture of the additional mobile device;
 assign a security reputation to the wireless network access point based on the similarity between the security posture of the mobile device and the security posture of the additional mobile device; and
 enable a requesting mobile device to determine whether to connect to the wireless network access point by, before the requesting mobile device connects to the wireless network access point, providing the security reputation of the wireless network access point to the requesting mobile device.

20. The non-transitory computer-readable medium of claim 19, wherein the unique identifier for the wireless network access point comprises at least one of:
- a physical address;
- a network address; and
- a unique network name.

* * * * *

UNITED STATES PATENT AND TRADEMARK OFFICE
CERTIFICATE OF CORRECTION

PATENT NO. : 10,212,602 B2
APPLICATION NO. : 15/231714
DATED : February 19, 2019
INVENTOR(S) : Ajitesh RoyChowdhury et al.

Page 1 of 1

It is certified that error appears in the above-identified patent and that said Letters Patent is hereby corrected as shown below:

On the Title Page

Insert:
--(30) Foreign Application Priority Data
Jun. 24, 2016 (IN)..............201621021772--.

Signed and Sealed this
Twenty-third Day of July, 2019

Andrei Iancu
*Director of the United States Patent and Trademark Office*